(12) United States Patent
Kim et al.

(10) Patent No.: US 11,126,855 B2
(45) Date of Patent: Sep. 21, 2021

(54) ARTIFICIAL-INTELLIGENCE POWERED GROUND TRUTH GENERATION FOR OBJECT DETECTION AND TRACKING ON IMAGE SEQUENCES

(71) Applicant: Robert Bosch GmbH, Stuttgart (DE)

(72) Inventors: Ji Eun Kim, Pittsburgh, PA (US);
Wan-Yi Lin, Pittsburgh, PA (US);
Lixiu Yu, Pittsburgh, PA (US); Govind Rathore, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 134 days.

(21) Appl. No.: 16/535,742

(22) Filed: Aug. 8, 2019

(65) Prior Publication Data
US 2021/0042530 A1 Feb. 11, 2021

(51) Int. Cl.
*G06K 9/00* (2006.01)
*G06N 20/00* (2019.01)
*G06K 9/62* (2006.01)

(52) U.S. Cl.
CPC ..... *G06K 9/00744* (2013.01); *G06K 9/00201* (2013.01); *G06K 9/00671* (2013.01); *G06K 9/6256* (2013.01); *G06N 20/00* (2019.01)

(58) Field of Classification Search
CPC ........... G06K 9/00744; G06K 9/00201; G06K 9/00671; G06K 9/6256; G06N 20/00
USPC ...................................................... 382/103
See application file for complete search history.

(56) References Cited

U.S. PATENT DOCUMENTS

| 2018/0260759 | A1 | 9/2018 | Bencke et al. |
| 2018/0314921 | A1* | 11/2018 | Mercep .................. G01S 13/87 |
| 2019/0362186 | A1* | 11/2019 | Irshad ....................... G08G 1/04 |

FOREIGN PATENT DOCUMENTS

EP 2704060 A1 3/2014

OTHER PUBLICATIONS

Simonyan et al., Very Deep Convolutional Networks for Large-Scale Image Recognition, Visual Geometry Group, Department of Engineering Science, University of Oxford, arXiv:1409.1556v6 [cs.CV] Apr. 10, 2015.
(Continued)

*Primary Examiner* — Ayodeji O Ayotunde
(74) *Attorney, Agent, or Firm* — Brooks Kushman P.C.

(57) ABSTRACT

A storage maintains raw image data including video having a sequence of frames, and annotations of the frames that indicate aspects of objects identified in the respective frames. A processor determines, for annotation of key frames of the raw image data, a task type for key frames and an agent type for key frames, receives annotations of objects identified in the key frames of the raw image data according to the key frame task type and key frame agent type, selects to review the key frames based on a confidence level of the annotations of the key frames, determines, for annotation of intermediate frames of the raw image data, a task type for intermediate frames and an agent type for intermediate frames, and receives annotations of objects identified in the intermediate frames of the raw image data according to the intermediate frame task type and intermediate frame agent type.

24 Claims, 16 Drawing Sheets

(56) References Cited

OTHER PUBLICATIONS

He et al., Deep Residual Learning for Image Recognition, 2016 IEEE Conference on Computer Vision and Pattern Recognition, pp. 770-778.
Howard et al., MobileNets: Efficient Convolutional Neural Networks for Mobile Vision Applications, arXiv:1704.04861v1 [cs.CV], Apr. 17, 2017.

* cited by examiner

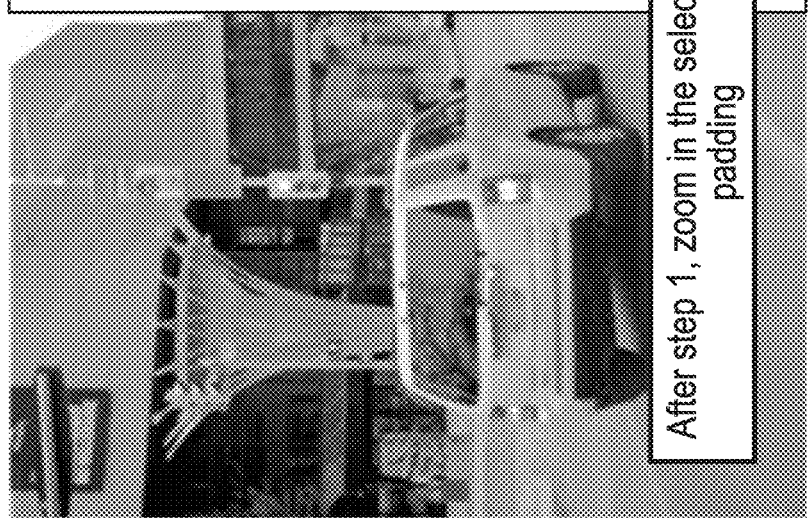

Goal: Accurate bounding box and centerline for all pedestrians with AI assistance.

Steps:
1. Click two points top left and bottom right points to cover pedestrian.
2. AI will generate bounding box.
3. Teach AI by clicking correct outmost point(s).
4. AI will generate centerline.
5. Teach AI by clicking correct centerline.

Repeat this process until all the pedestrians have accurate boxes and centerlines.

When a patch is clicked, show pop-up "have you finished all pedestrians in the previous patch. You can't go back to it once opening this patch"

Click on this patch and discover more pedestrians once finishing all pedestrians in the previous patch.

Click on this patch and discover more pedestrians once finishing all pedestrians in the previous patch.

After step 1, zoom in the selected area + padding

FIG. 10

ARTIFICIAL-INTELLIGENCE POWERED GROUND TRUTH GENERATION FOR OBJECT DETECTION AND TRACKING ON IMAGE SEQUENCES

TECHNICAL FIELD

The present disclosure relates to aspects of an artificial-intelligence (AI) powered ground truth generation for object detection and tracking on image sequences.

BACKGROUND

Ground truths used in safety-critical systems often require high precision in geometric shape annotation and complex attributes compared to stereotypes of annotation used in public datasets. For example, a stereotype of pedestrian annotation used in public datasets requires loose bounding box to cover a visible part of a pedestrian. However, annotation for the safety-critical systems often requires an estimated bounding box with a pixel level accuracy together with centerline of the body and additional attributes such as body pose and head angle. Due to this complexity and lengthy requirements along with various scenes, it takes too long for human annotators to be aware of all requirements needed for annotation tasks. This prevents scaling out the number of annotators due to the high learning curve to understand the requirements. Furthermore, the high cost of human-only annotation is an obstacle to producing large amounts of annotation data, which is a pre-requisite to data driven machine learning algorithms such as deep learning.

SUMMARY

In one or more illustrative examples, a system for human-machine collaborated high-precision ground truth data generation for objects identification, localization, and tracking in a sequence of images includes a user interface; a storage configured to maintain raw image data including video having a sequence of frames, and annotations of the frames that indicate aspects of objects identified in the respective frames; and a processor, in communication with the storage and the user interface. The processor is programmed to determine, for annotation of key frames of the raw image data, a task type for key frames and an agent type for key frames; receive annotations of objects identified in the key frames of the raw image data according to the key frame task type and key frame agent type; select to review the key frames based on a confidence level of the annotations of the key frames; determine, for annotation of intermediate frames of the raw image data, a task type for intermediate frames and an agent type for intermediate frames; and receive annotations of objects identified in the intermediate frames of the raw image data according to the intermediate frame task type and intermediate frame agent type.

In one or more illustrative examples, a method for human-machine collaborated high-precision ground truth data generation for objects identification, localization, and tracking in a sequence of images, includes maintaining raw image data including video having a sequence of frames, and annotations of the frames that indicate aspects of objects identified in the respective frames, the objects including one or more of pedestrians, cyclists, animals, vehicles, animals, and moving objects in an indoor environment, the annotations include one or more of geometric shapes around the objects, centerlines of the objects, or directions of travel of the objects; determining, for annotation of key frames of the raw image data, a task type for key frames and an agent type for key frames, the task type including one of a human-only annotation task type, an AI-interactive task type, or a human task with machine-learning pre-labels task type, the agent type including one of a worker with average annotation skill, a worker with expert skill, or a machine using a machine-learning model; receiving annotations of objects identified in the key frames of the raw image data according to the key frame task type and key frame agent type; selecting to review the key frames based on a confidence level of the annotations of the key frames; determining, for annotation of intermediate frames of the raw image data, a task type for intermediate frames and an agent type for intermediate frames; and receiving annotations of objects identified in the intermediate frames of the raw image data according to the intermediate frame task type and intermediate frame agent type.

In one or more illustrative examples, a computer-readable medium includes instructions that, when executed by a processor, cause the processor to maintain raw image data including video having a sequence of frames, and annotations of the frames that indicate aspects of objects identified in the respective frames, the objects including one or more of pedestrians, cyclists, animals, vehicles, animals, and moving objects in an indoor environment, the annotations include one or more of geometric shapes around the objects, centerlines of the objects, or directions of travel of the objects; determine, for annotation of key frames of the raw image data, a task type for key frames and an agent type for key frames, the task type including one of a human-only annotation task type, an AI-interactive task type, or a human task with machine-learning pre-labels task type, the agent type including one of a worker with average annotation skill, a worker with expert skill, or a machine using a machine-learning model; receive annotations of objects identified in the key frames of the raw image data according to the key frame task type and key frame agent type; select to review the key frames based on a confidence level of the annotations of the key frames, the confidence level being based on one or more of (i) performance of a worker performing the annotation task, (ii) overall performance of the worker across a plurality of annotation tasks, (iii) a prediction score determined based on a machine-identification of the annotations, or (iv) an analysis of the image quality of the raw image data; determine, for annotation of intermediate frames of the raw image data, a task type for intermediate frames and an agent type for intermediate frames; and receive annotations of objects identified in the intermediate frames of the raw image data according to the intermediate frame task type and intermediate frame agent type.

BRIEF DESCRIPTION OF THE DRAWINGS

FIG. 10 illustrates an example of a user interface for performing AI-assisted manual annotations;

DETAILED DESCRIPTION

Figure 1:
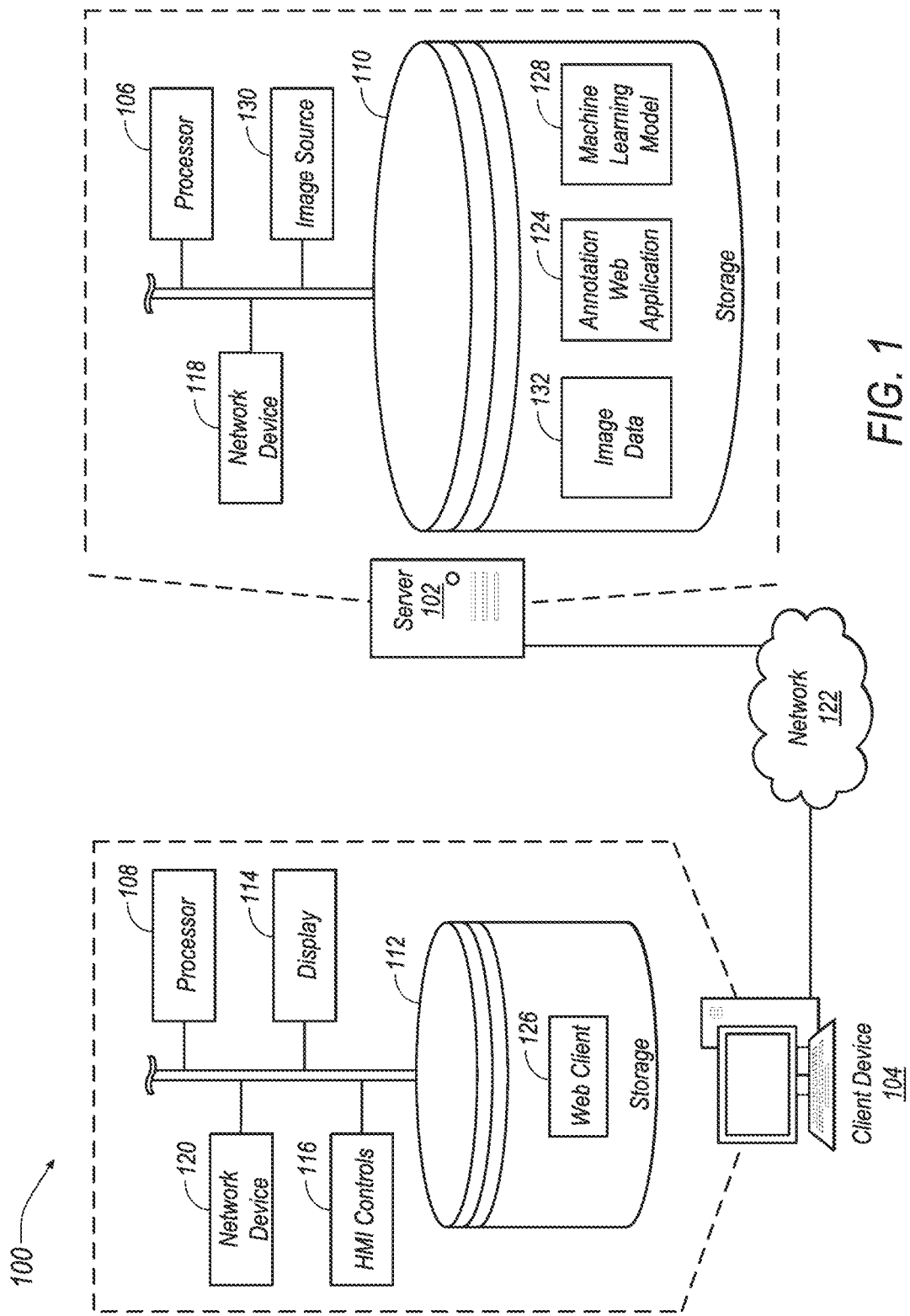
FIG. 1 illustrates an example annotation system for the capture and annotation of image data.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

This disclosure relates to systems and methods for human and machine collaborated high-precision ground truth data generation for object detection/localization/tracking tasks on sequence of images at scale. Target objects for annotation include pedestrians, cyclists, animals, various types of vehicles in the outdoor environment and people, animals and any moving objects in the indoor environment. The disclosed methods enable decomposition of annotation tasks into multiple tasks automated in a workflow and dynamically assign each to human annotator(s) or machine in order to deliver ground truths efficiently. The ground truths generated from the annotation process are used to re-train machine learning models used in the annotation process to improve machine prediction over time. The annotation process is divided into two major steps: key frame annotations and intermediate frame annotations, which have different tasks in the workflow but share similar tasks.

Machine learning models, optionally with humans in the loop that are used for ground truths generation can be used for other purposes such as prediction of object recognition services.

To address the scalability and efficiency for annotation tasks, the system in this disclosure decomposes a complex annotation task into multiple micro-/machine tasks. Each micro-task is designed to be performed by any workers who have passed basic training and qualification, without remembering full requirements. Machine tasks are designed to apply cutting-edge machine learning models to make the annotation process efficient. To improve efficiency more over time, the machine learning models from previous annotations are used as-is or after re-trained properly for example applying transfer learning. Depending on the characteristics of images collected from various cameras, mounted locations and deployed environment, the machine learning models from previous annotations are used as-is or re-trained properly for example applying transfer learning.

As explained in detail herein, the disclosure provides for a human-machine collaboration for data annotation at scale. Efficiency in large scale data annotation may be provided by integrating machine learning models and humans in the loop for the annotation process, and by improving machine prediction by retraining with the data from previous batches over time. A manual/human annotation may be time consuming and expensive. This disclosure, accordingly, provides for systems and methods to reduce human annotation efforts by increasing the number of accurate machine annotation that does not require adjustment of geometric shape annotation.

Additionally, the described systems and methods provide for a reduction of cognitive load in complex annotation tasks. Indeed, it may take significant time for a novice human annotator to learn complex annotation requirements to be able to annotate an entire video without errors. The proposed systems and methods reduce learning time for human annotators by dividing a full annotation job into multiple machine tasks that can be done by many people. Thus, the systems and methods are scalable to quickly recruit and train human annotators.

With respect to a machine and interactive annotation user interface, machine learning models are used for some tasks in the annotation work flow to generate annotation automatically or collaboratively with human annotators through an interactive UI. With respect to quality control in crowdsourcing tasks, quality control mechanisms are embedded in the design of tasks and workflow.

As described herein, efficient and scalable ground truths generation system and methods produce high precision (pixel level accuracy) annotations that are used to develop object detection/localization, object tracking. This disclosure provides for systems and methods for human and machine collaborated high precision ground truth data generation for object detection/localization/tracking tasks on sequence of images at scale. As some examples, objects for annotation include pedestrians, cyclists, animals, various types of vehicles in the outdoor environment and people, animals and any moving objects in the indoor environment.

FIG. 1 illustrates an example annotation system 100 for the capture and annotation of image data 132. The annotation system 100 includes a server 102 that hosts an annotation web application 124 that is accessible to client devices 104 over a network 122. The server 102 includes a processor 106 that is operatively connected to a storage 110 and to a network device 118. The server 102 further includes an image data input source 130 for the receipt of image data 132. The client device 104 includes a processor 108 that is operatively connected to a storage 112, a display device 114, human-machine interface (HMI) controls 116, and a network device 120. It should be noted that the example annotation system 100 is one example, and other systems 100 may be used. For instance, while only one client device 104 is shown, systems 100 including multiple client devices 104 are contemplated. As another possibility, while the example implementation is shown as a web-based application, alternate systems may be implemented as standalone systems or as client-server systems with thick client software.

Each of the processor 106 of the server 102 and the processor 108 of the client device 104 may include one or more integrated circuits that implement the functionality of a central processing unit (CPU) and/or graphics processing unit (GPU). In some examples, the processors 106, 108 are a system on a chip (SoC) that integrates the functionality of the CPU and GPU. The SoC may optionally include other components such as, for example, the storage 110 and the network device 118 or 120 into a single integrated device. In other examples, the CPU and GPU are connected to each other via a peripheral connection device such as PCI express or another suitable peripheral data connection. In one example, the CPU is a commercially available central processing device that implements an instruction set such as one of the x86, ARM, Power, or MIPS instruction set families.

Regardless of the specifics, during operation, the processors 106, 108 execute stored program instructions that are retrieved from the storages 110, 112, respectively. The stored program instructions accordingly include software that controls the operation of the processors 106, 108 to perform the operations described herein. The storages 110, 112 may include both non-volatile memory and volatile memory devices. The non-volatile memory includes solid-state memories, such as NAND flash memory, magnetic and optical storage media, or any other suitable data storage device that retains data when the annotation system 100 is deactivated or loses electrical power. The volatile memory includes static and dynamic random-access memory (RAM) that stores program instructions and data during operation of the annotation system 100.

The GPU of the client device 104 may include hardware and software for display of at least two-dimensional (2D) and optionally three-dimensional (3D) graphics to a display device 114 of the client. The display device 114 may include an electronic display screen, projector, printer, or any other suitable device that reproduces a graphical display. In some examples, the processor 108 of the client 104 executes software programs using the hardware functionality in the GPU to accelerate the performance of machine learning or other computing operations described herein.

The HMI controls 116 of the client 104 may include any of various devices that enable the client device 104 of the annotation system 100 to receive control input from workers or other users. Examples of suitable input devices that receive human interface inputs may include keyboards, mice, trackballs, touchscreens, voice input devices, graphics tablets, and the like.

The network devices 118, 120 may each include any of various devices that enable the server 102 and client device 104, respectively, to send and/or receive data from external devices over the network 122. Examples of suitable network devices 118, 120 include a network adapter or peripheral interconnection device that receives data from another computer or external data storage device, which can be useful for receiving large sets of data in an efficient manner.

The annotation web application 124 be an example of a software application executed by the server 102. When executed, the annotation web application 124 may use various algorithms to perform aspects of the operations described herein. In an example, the annotation web application 124 may include instructions executable by the processor 106 of the server 102 as discussed above. Computer-executable instructions may be compiled or interpreted from computer programs created using a variety of programming languages and/or technologies, including, without limitation, and either alone or in combination, JAVA, C, C++, C#, VISUAL BASIC, JAVASCRIPT, PYTHON, PERL, PL/SQL, etc. In general, the processor 106 receives the instructions, e.g., from the storage 110, a computer-readable medium, etc., and executes these instructions, thereby performing one or more processes, including one or more of the processes described herein. Such instructions and other data may be stored and transmitted using a variety of computer-readable media.

The web client 126 may be a web browser, or other web-based client, executed by the client device 104. When executed, the web client 126 may allow the client device 104 to access the annotation web application 124 to display user interfaces of the annotation web application 124. The web client 126 may further provide input received via the HMI controls 116 to the annotation web application 124 of the server 102 over the network 122.

In artificial intelligence (AI) or machine learning systems, model-based reasoning refers to an inference method that operates based on a machine learning model 128 of a worldview to be analyzed. Generally, the machine learning model 128 is trained to learn a function that provides a precise correlation between input values and output values. At runtime, a machine learning engine uses the knowledge encoded in the machine learning model 128 against observed data to derive conclusions such as a diagnosis or a prediction. One example machine learning system may include the TensorFlow AI engine made available by Alphabet Inc. of Mountain View, Calif., although other machine learning systems may additionally or alternately be used. As discussed in detail herein, the annotation web application 124 and machine learning model 128 may be configured to recognize and annotate features of the image data 132 for use in the efficient and scalable ground truths generation system and methods to produce high precision (pixel level accuracy) annotations that are used to develop object detection/localization, object tracking.

The image data source 130 may be a camera, e.g., mounted on a moving object such as car, wall, pole, or installed in a mobile device, configured to capture image data 132. In another example, the image data input 132 may be an interface, such as the network device 118 or an interface to the storage 110, for the retrieval of previously-captured image data 132. The image data 132 may be video, e.g., a sequence of images. Each image in the image data 132 may be referred to herein as a frame. For privacy concerns, faces and license plates may be blurred from the image data 132 for certain annotation tasks.

Figure 2:
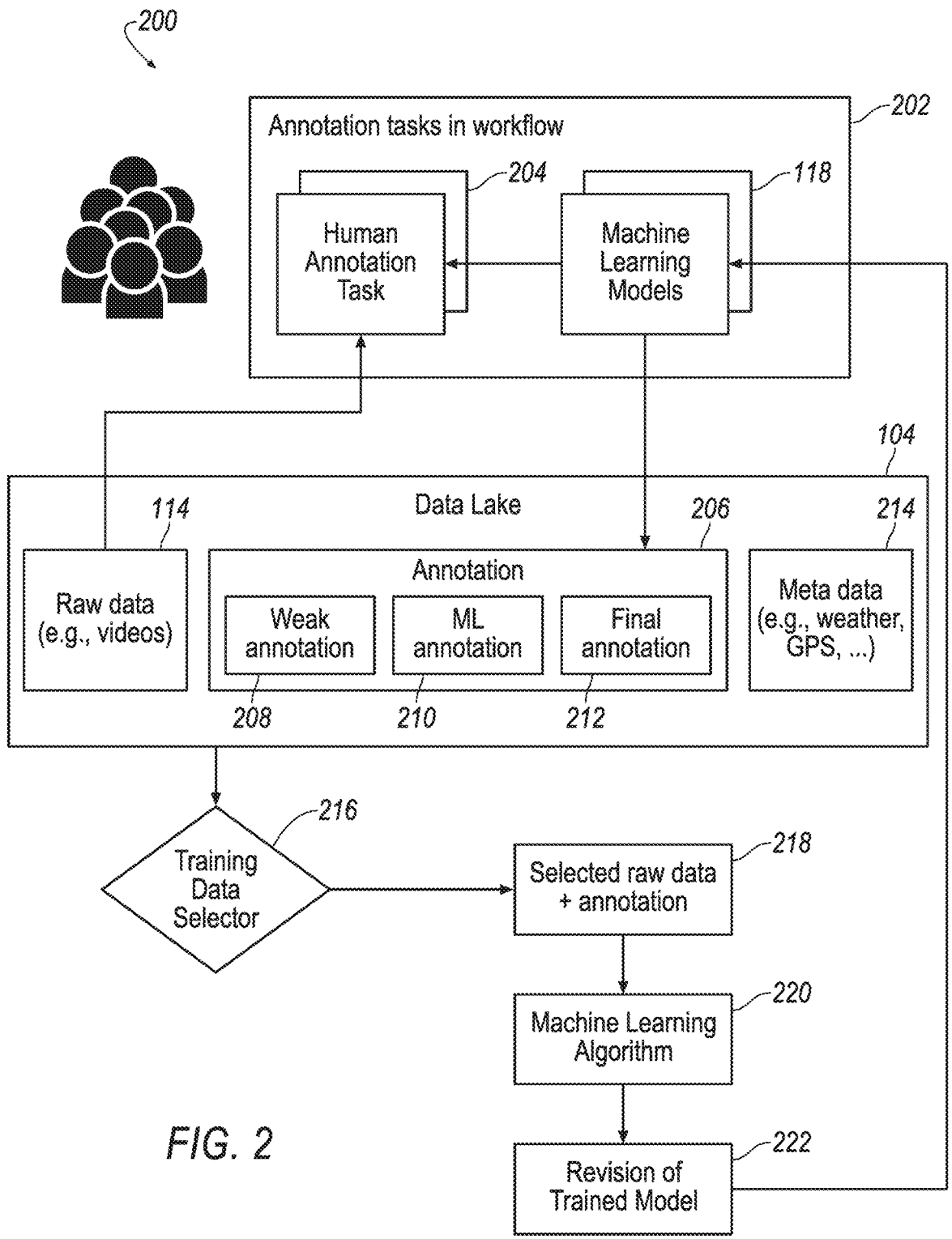
FIG. 2 illustrates an example of a data diagram for the annotation of image data.

FIG. 2 illustrates an example 200 of a data diagram for the annotation of image data 132. As shown, the raw image data 132, such as videos, is stored in a data lake (e.g., the storage 110, drive, or other storage device). In an annotations task workflow 202, the raw image data 132 is provided to a human annotation task 204 to create annotations 206. The annotations 206 may include, for example, weak annotations 208, machine-learned annotations 210, and final annotations 212. Additional metadata 214 may also be stored with respect to the raw image data 132. For instance, this additional metadata 214 may include weather conditions during which the raw image data 132 was captured, geographic locations of where the raw image data 132 was captured, times during which the raw image data 132 was captured, etc. As discussed in further detail below, a training data selector 216 may be used to select raw image data 132 and annotations 206 from the memory 110 as shown at 218. A machine-learning algorithm at 220 receives the selected raw image data 132 and annotations and creates a revision of the trained model at 222. This trained model is then used by the annotation task workflow 202 to provide the machine-learned annotations 210. The machine-learned annotations 210 may also be overseen by the human annotation task 204.

Figure 3:
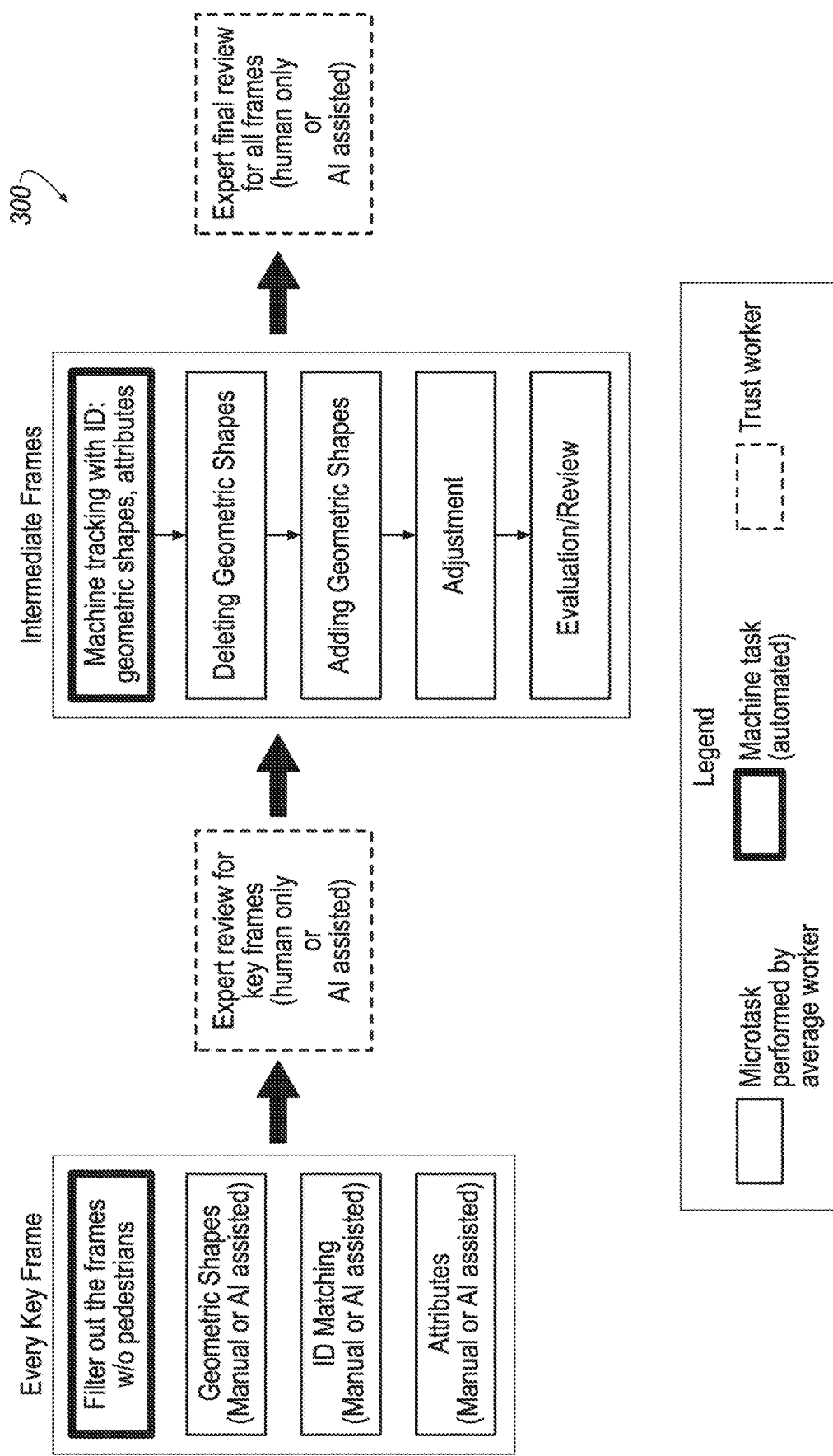
FIG. 3 illustrates an example workflow of the annotation tasks.

FIG. 3 illustrates an example 300 workflow of the annotation tasks. In general, the workflow of the annotation is divided into two phases: 1) key frame annotation and 2) intermediate frame annotation. If a key frame interval is one, then all frames are annotated like a key frame without intermediate frame annotation. With respect to key frame annotation, key frame interval selection is performed, then annotation type and tasks are performed, then a review of the key frame annotations may be performed. With respect to the intermediate frame annotation, the intermediate frame annotations are generated by machine first then human annotators validate correctness of machine annotations and provide feedback to machine by correcting annotations.

Regarding key frame annotation, a key frame interval selection is performed. In an example, the key frame interval may be selected or configured in the annotation system 100 as a static value (e.g., key frame interval is 5). In another example, the key frame interval may be defined pursuant to a formula or function with important parameters in the domain. For instance, a key frame interval selection function in autonomous driving domain may be represented with parameters of car speed, steering wheel, road type (city, highway), etc. and/or scene similarity/difference across nearby frames. The key frame interval may be dynamically selected by annotators to maximize their efficiency and annotation accuracy when they interact with underlying machine that auto-generates annotations for subsequent frames upon annotators input.

With respect to annotation types and tasks, the annotation system 100 may be dynamically configured for different annotation tasks depending on efficiency or other reasons. The annotation system 100 may also be configured for the maximum and minimum number of tasks assigned to one annotator.

Regarding manual or human-only annotation, the annotations may be done mainly by human annotator(s). Depending on task complexity, human annotators may be qualified for a given task type by performing an online training class and by passing a qualification test.

Figure 4:
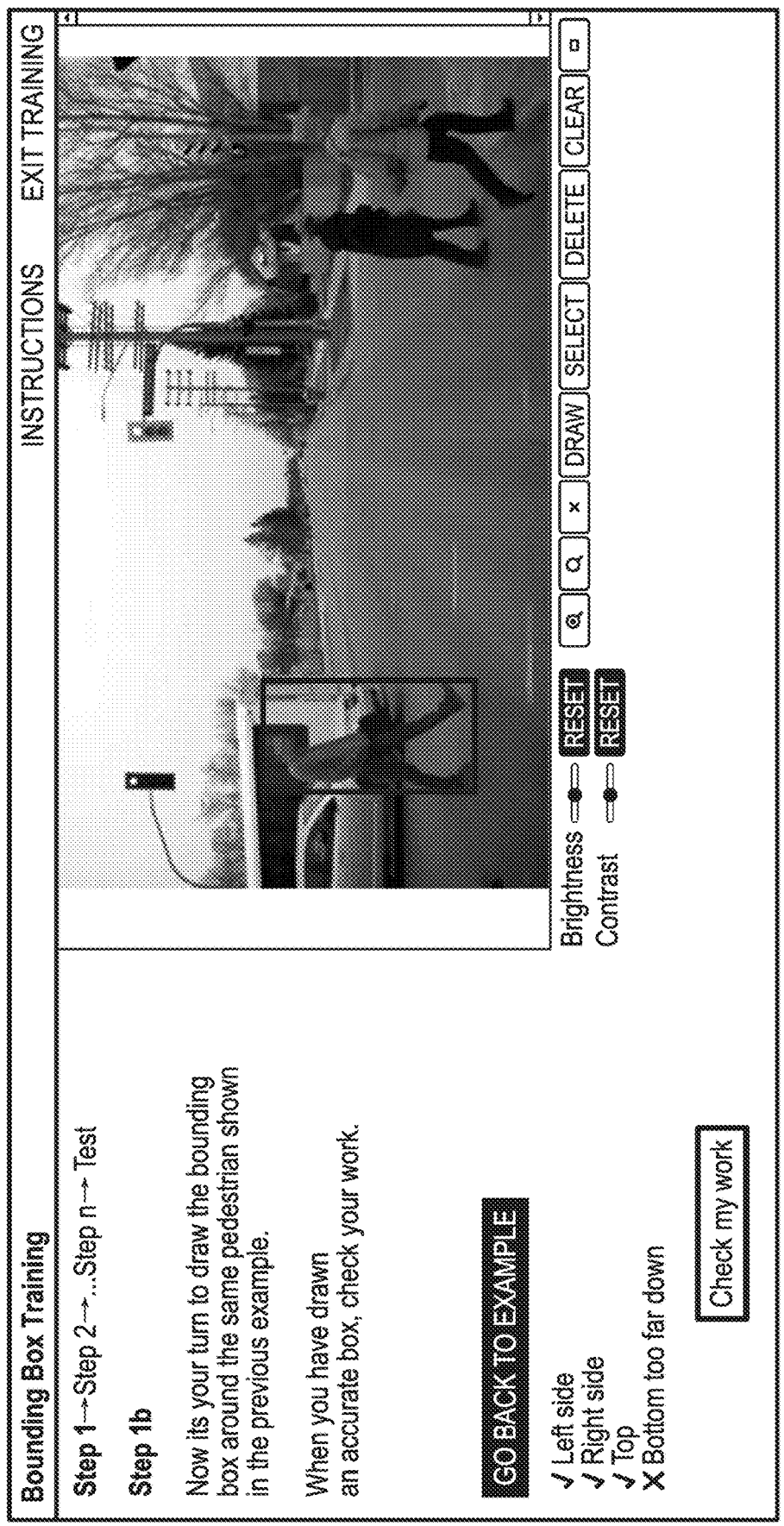
FIG. 4 illustrates an example of qualification task.

FIG. 4 illustrates an example 400 of qualification task. As shown, the example 400 illustrates an annotation task interface, in which an aspect of bounding box training is shown where it is the human operator's turn to draw a bounding box around the same pedestrian shown in a previous example. User interface buttons are provided in the displayed user interface to allow the human to draw the box. Once the box has been drawn, the check my work control may be selected to allow the user to have the work checked.

The annotation task interface may include an instruction pane in which the instructions may be provided, and an annotation pane, where annotators can draw a geometric shape over a target object on an image/frame. The geometric shapes may include bounding boxes, centerlines, cuboids, L-shapes, single or multi-points, lines or free drawing forms. It should be noted that these are common examples of shapes that may be used in annotation tasks, but different shapes may be used. The annotation task may include providing various attributes such as body pose of a person, head angle of person, etc. Note that these are specific requirements that may be used only in certain examples, and some implementations do not have these attributes for pedestrian annotation. Moreover, different object types may have different attributes. For instance, a pedestrian may have a walking direction or body pose attributes, but a vehicle may not.

The annotation task may include an object matching task which is asked to identify same object on different frames. If one annotator is asked to draw a geometric shape for the same object across frames, an object ID may be assigned to each of the annotations across frames. If the frames are divided into multiple annotation tasks, ID matching tasks may be created to find a same object across frames. Optionally ID matching may be preliminarily done by machine before creating an ID matching task for human annotator. Examples of manual annotations are illustrated with respect to FIGS. 5, 6, and 7. Examples of ID matching are illustrated with respect to FIGS. 8 and 9.

Figure 5:
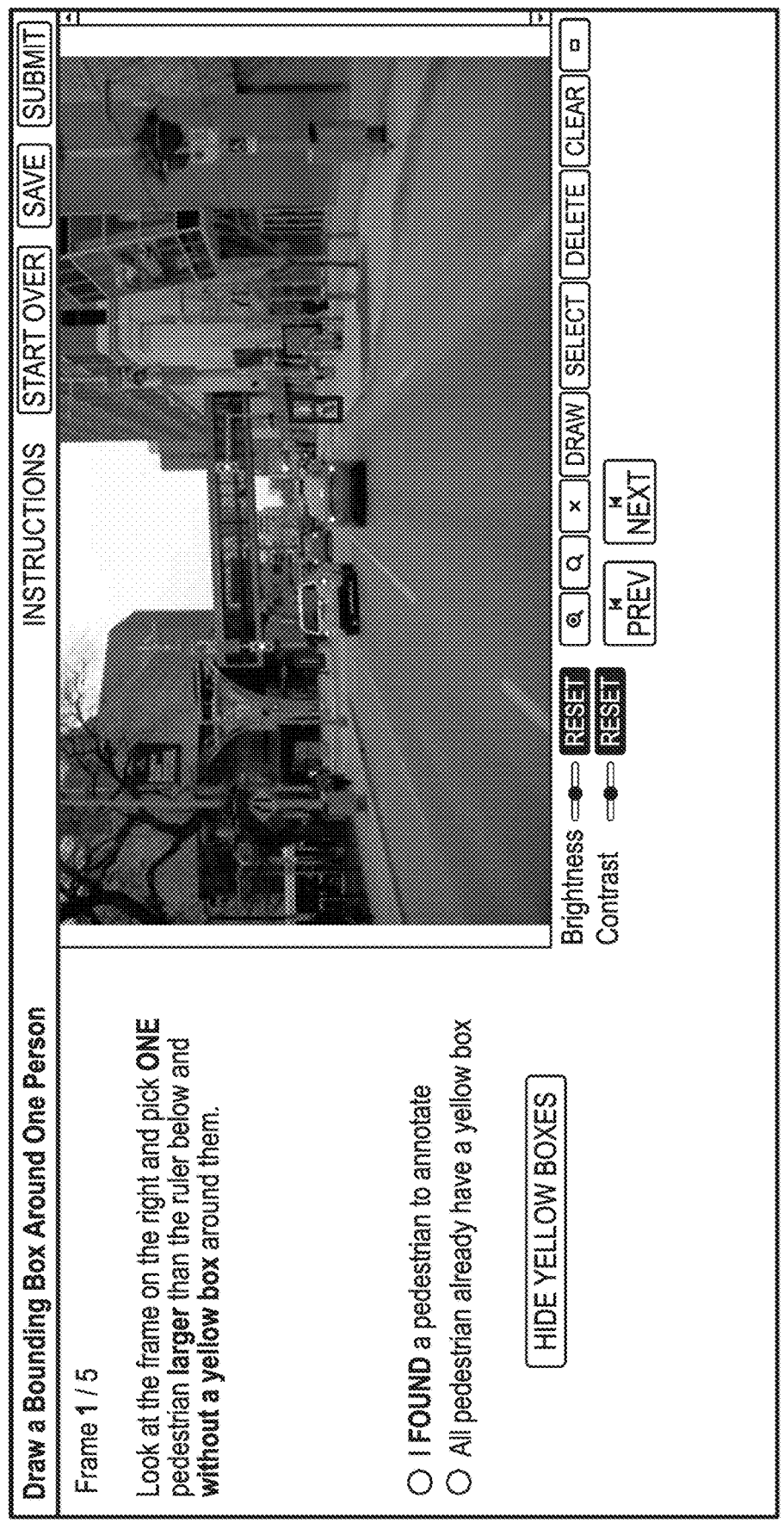
FIG. 5 illustrates an example of a user interface for performing manual annotations.

FIG. 5 illustrates an example 500 of a user interface for performing manual annotations. In an example, the user interface may be provided to the display 114. The title of the user interface indicates that the user interface is for the drawing of a bounding box around one person for five frames of raw image data 132. As shown, the manual annotation user interface includes an instruction pane instructing the user to look at the frame to the right and pick one pedestrian larger than the rules shown below and without a yellow box around it. If such a pedestrian is found, the user may select a control to indicate that a pedestrian was found to annotate. If not, the user may select a control to indicate that all pedestrians already have a box. The user interface may also include an annotation page displaying a frame of the raw image data 132 from which the user may attempt to identify pedestrians.

Figure 6:
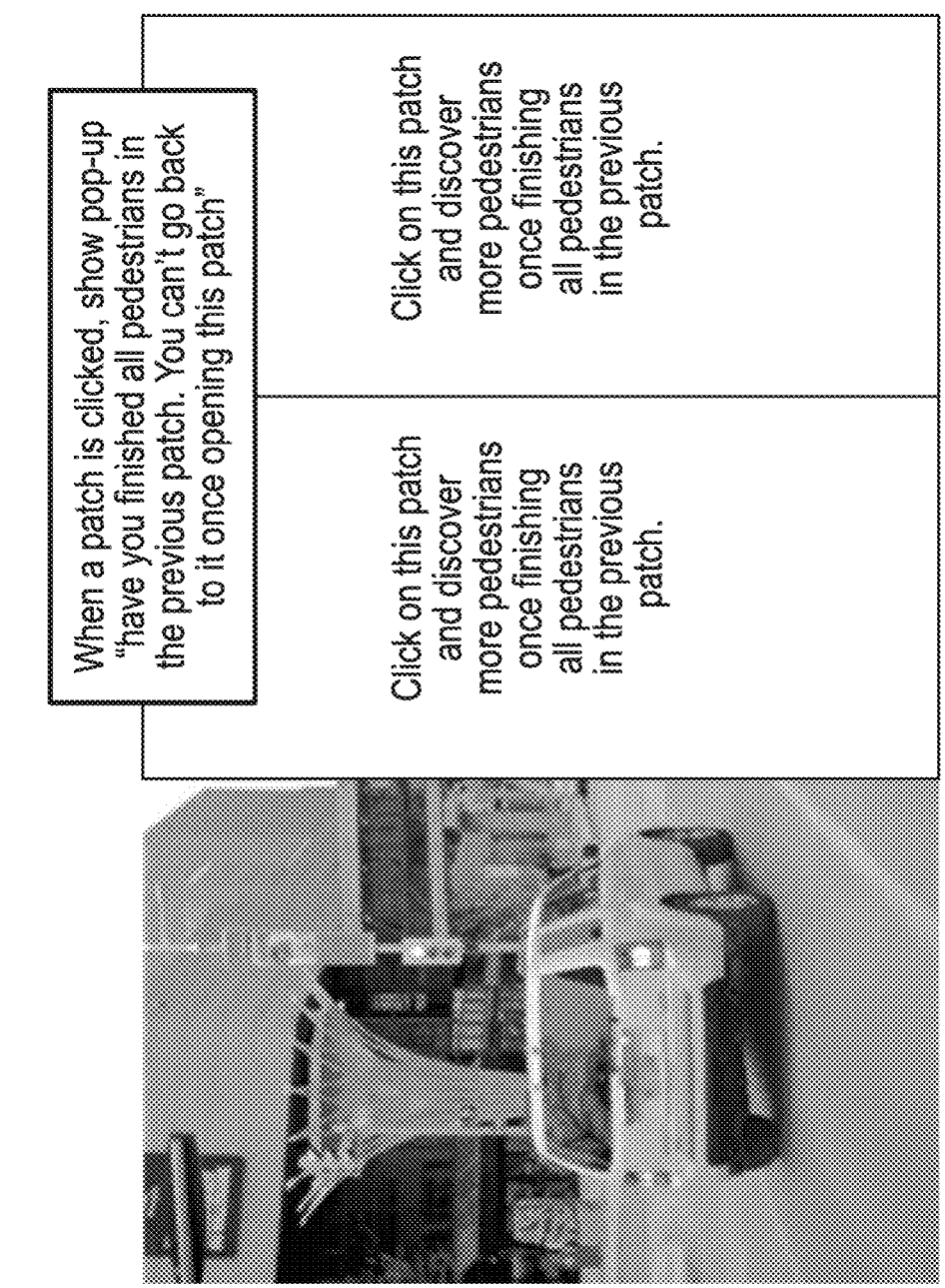
FIG. 6 illustrates an example of further aspects of a user interface for performing manual annotations.

FIG. 6 illustrates an example 600 of further aspects of a user interface for performing manual annotations. As indicated, a goal of the user interface is the identification of accurate bounding boxes and centerlines for all pedestrians. The operations that may be used to identify a new pedestrian include to click on a "new pedestrian" control of the user interface, and then select the outermost points of the four sides of the pedestrian's body. If a pedestrian is partially occluded, then the points should be entered to estimate the covered outermost points. Next, the user may adjust the centerline to cross the center of the hip of the pedestrian. This process may be repeated until all the pedestrians have accurate boxes and centerlines. Extra attention may be paid to dark areas as well as to small pedestrians in the image. In one example, the human operator may be compensated per box entered or per pedestrian identified. If so, an indication of the human operator's earnings may be included in the user interface.

In an example, if the machine learning aspect of the annotation system 100 determines that there are more than a predefined number of pedestrians in the image (e.g., 20 pedestrians), the user interface may provide the users with a choice to stop and submit after a portion of the pedestrians are located (e.g., once 20 are located).

In an example, if an image includes a large number of pedestrians, then the image may be divided into different patches to be manually annotated separately. The user may be able to view one of the patches initially, and may be able to click on the additional patches to show that portion of the image. In some implementations, once a new patch is shown, the user may not be able to return to the previous patch.

Figure 7:
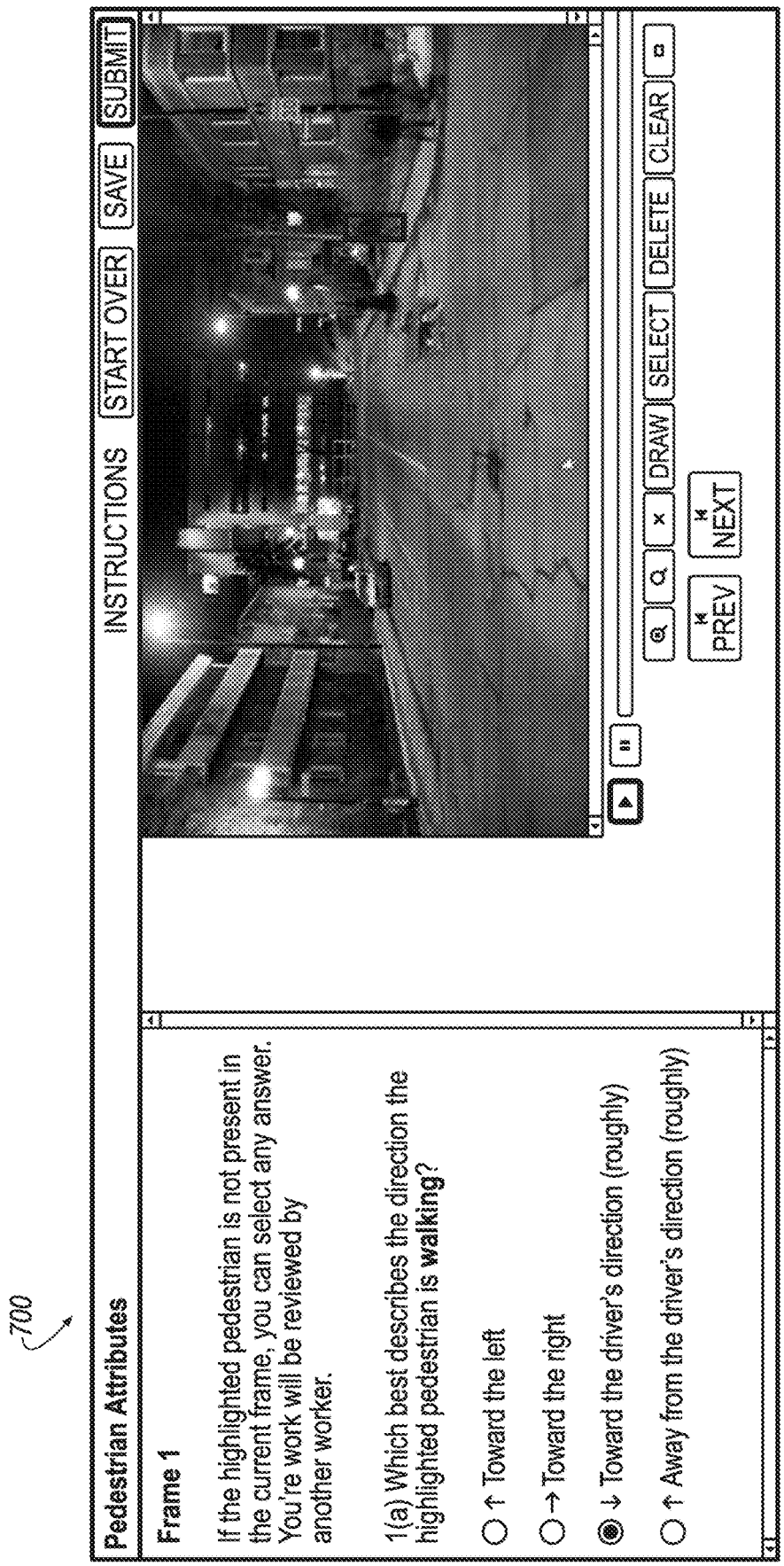
FIG. 7 illustrates an example of the annotation of pedestrian direction.

FIG. 7 illustrates an example 700 of the annotation of pedestrian direction. In addition to bounding box and centerline, additional attributes of the pedestrians such as the direction the pedestrian is walking may be annotated in the images. As shown, the title of the user interface indicates that the user interface is for identification of pedestrian direction. Additionally, the annotation user interface includes an instruction pane instructing the user to identify which direction best describes a direction that a pedestrian highlighted in the annotation pane is walking. The choices may include that the pedestrian is walking to the left, is walking to the right, is walking towards the driver's direction (roughly), or is walking away from the driver's direction (roughly). The user interface may further ask which angle best reflects the angle that the highlighted pedestrian is walking, and may provide some example angles. Additionally, the instruction pane indicates that if a highlighted pedestrian is not present in the current frame, that any answer may be selected, and that the reviewer's work will be reviewed by another worker. The user interface may also include an annotation page displaying a frame of the raw image data 132 from which the user may attempt to identify the direction of walk of the pedestrian.

Figure 8:
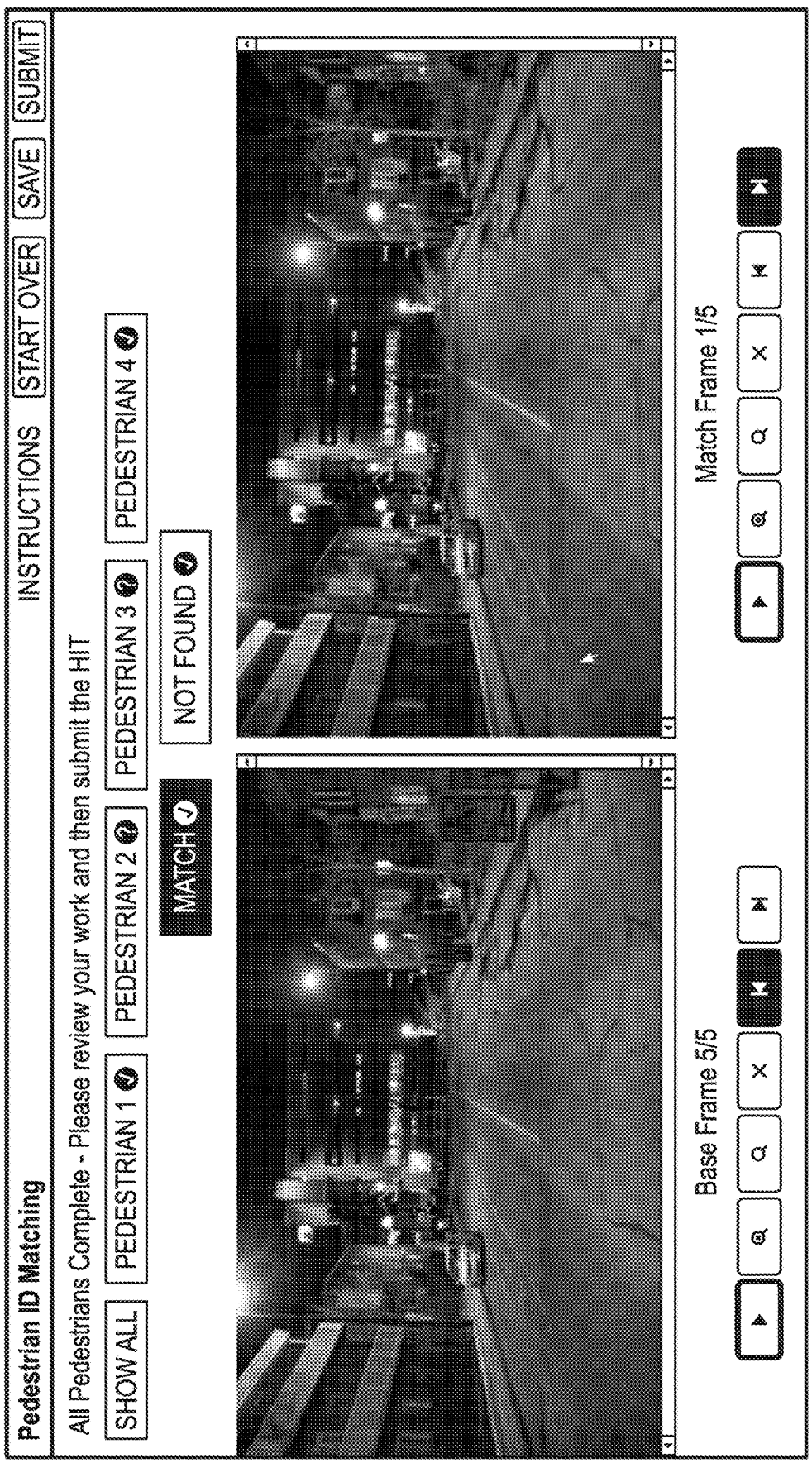
FIG. 8 illustrates an example of pedestrian ID matching.

FIG. 8 illustrates an example 800 of pedestrian ID matching. As shown, the user interface provides for selection of one or more of a set of pedestrians that are identified in a base frame (illustrated on the left). The user interface also provides a match frame (illustrated on the right) from which the user may map the same pedestrians. In this way, the same ID may be used for the same pedestrian across frames.

Figure 9:
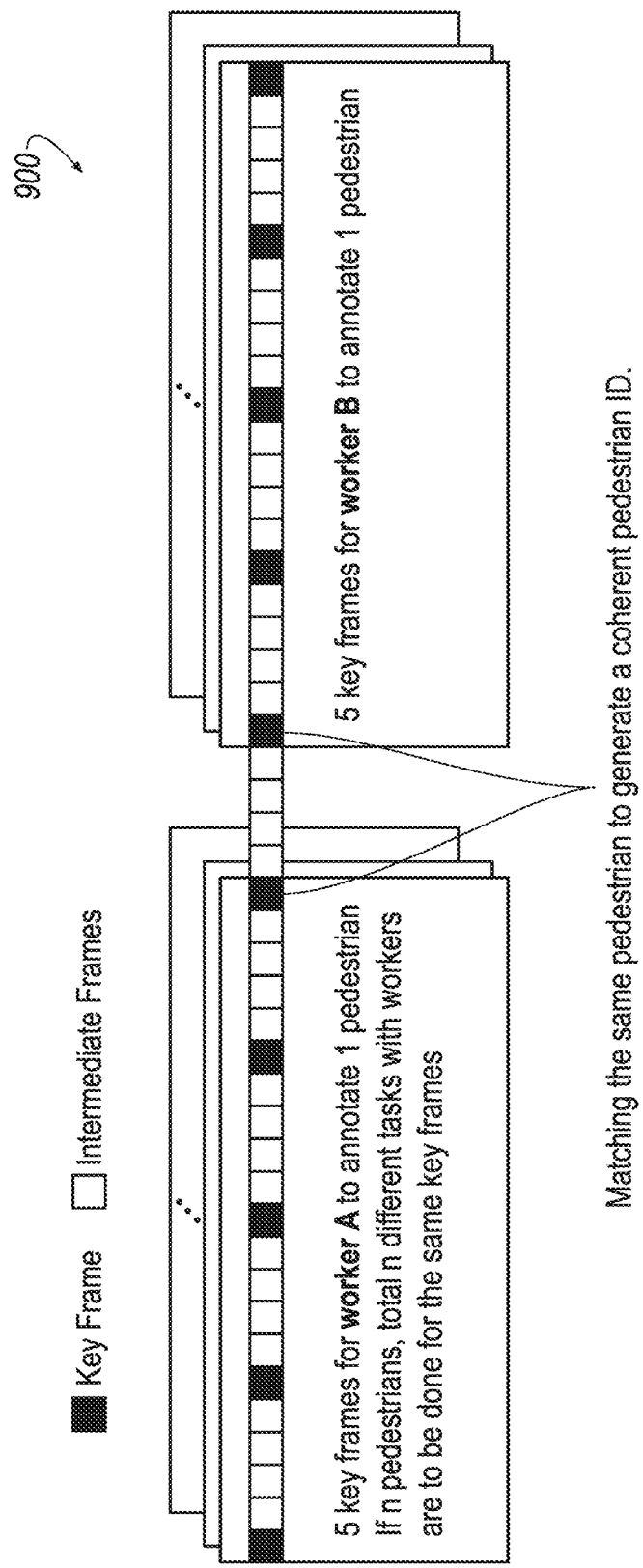
FIG. 9 illustrates an example of frames of raw image data with respect to pedestrian ID matching.

FIG. 9 illustrates an example 900 of frames of raw image data with respect to pedestrian ID matching. As shown, five key frames are requested for a worker A to annotate of one pedestrian. (If there are n pedestrians, then a total of n different tasks with workers are to be done for the same key frames.) Also as shown, a next set of five key frames are requested for a worker B to annotate of the same pedestrian. Between the two sets of frames, there should be a matching of the same pedestrian to generate a coherent pedestrian ID.

Turning to AI-assisted annotation, this annotation type may be designed to be interactively done with annotators and machine. A human annotator may provide a weak label on a target object (e.g., a single point click on a center of the target object, a rough bounding box covering a target object, etc.) A machine task may provide a refined/accurate geometric shape annotation (e.g., precise bounding box on a target pedestrian). If a machine-generated geometric shape annotation is inaccurate and/or not within a tolerance range, then the annotator may provide feedback simply by correcting any incorrect parts through a user interface. The weak label, original machine predicted annotation, and human corrected annotation may be saved to the annotation system 100 to retrain the machine online or offline.

Machine-generated annotations may be achieved by various approaches. In one example, an approach may be utilized that takes an image patch as input and estimates a tight bounding box around the main object in the image patch as output. The input image patch may be a cropped region from the original image based on estimated object location by an object detector or tracker. A deep convolutional network architecture may be utilized that efficiently reduces errors of the computer vision pre-labels and that is easily adopted to datasets that are different from the training data. The latter property may be useful in annotation systems 100 since they usually encounter data with different metadata characteristics (e.g., different camera parameters, different conditions in road and weather, etc.).

Different geometric shape annotations may also leverage other machine learning algorithms. In an example, to have an accurate bounding box, a machine-generated semantic segmentation annotation may be used by selecting the outmost points of (x, y) coordinates of a target segment. Similarly, a center of body annotation may be generated by leveraging key points of a body prediction.

FIG. 10 illustrates an example 1000 of a user interface for performing AI-assisted manual annotations. As shown, the user interface may indicate that the goal is the annotation of accurate bounding boxes and centerlines for all pedestrians with AI assist. The steps that may be performed to do so may include to first click two points top left and bottom right to cover a pedestrian. The AI may then generate a bounding box. The AI may then be taught by the user clocking the correct outmost point(s) of the pedestrian, if necessary. If a pedestrian is partially occluded, then the points should be entered to estimate the covered outermost points. The AI may then generate the centerline. The AI may be taught by the user clicking to correct the centerline, if necessary. This process may be repeated until all the pedestrians have accurate boxes and center lines. Extra attention may be paid to dark areas as well as to small pedestrians in the image. In one example, the human operator may be compensated per box entered or per pedestrian identified. If so, an indication of the human operator's earnings may be included in the user interface. Additionally, the user interface may provide an indication of how much the AI learned from the user.

A third type of annotation, beyond manual annotation and AI-assisted annotation, is machine-initiated annotation with pre-labels. This annotation type may use an object detector to detect an object with object class/category. These detected objects may be input to the AI as image patches cropped from the video frames based on pre-labeled bounding boxes from computer vision algorithms, either object tracking or object detection. Before cropping the images, the four edges of the pre-labeled bounding boxes may be expanded to ensure that the visible part of the object is included in the image patch. The AI may then predict precise bounding boxes for the objects. A video annotation approach is one example, but the AI approach may be applied to any annotation systems 100 that utilize computer vision pre-labels, or be used to make rough bounding boxes drawn by annotators more precise. In such an annotation pipeline, an input video sequence of raw image data 132 is first divided into key frames (sampled every K frames, where K can be determined by the speed of car movements and environmental changes) and intermediate frames. Pre-labels in key frames may be initialized by object detectors, and then refined by the AI. Such key frame pre-labels may be reviewed and then corrected or re-drawn by a human worker to ensure key frame labels are precise. Annotated key frames may be used to populate pre-labels for intermediate frames using object trackers. Pre-labels for intermediate frames may then be refined by the AI, and may go through human annotators to correct them. The result may be that the detected objects input to the AI are refined into tight bounding boxes for the detected objects. Regardless, pre-labels from step 1 may be validated and/or corrected by the human annotator(s).

A review of key frame annotations may be performed by different human annotator(s) having high quality profiles before generating intermediate frame annotation to have high quality annotation. The review process may be one consolidated task, or it may be divided into multiple steps that can be performed by more than one human annotator. The review may be performed for all annotations, or may instead be done for targets-only annotations with a low confidence level. FIG. 6 illustrates an example.

Moving from key frame annotations to intermediate frame annotations, the intermediate frame annotations may be generated by a machine first. Then, human annotators may validate correctness of the machine annotations and provide feedback to machine by correcting the annotations.

Geometric shape and object ID generation may be performed by the machine. A pre-label location/position of a target object may be identified based on the position of a start key frame and an end key frame of selected frames. The position may be calculated with interpolation and computer vision technique such as kernelized correlation filters. The generated annotation may have the same ID.

A patch of a target object may be created (pre-labels from machine learning algorithms with extra regions) to get estimation of fine-grained (high precision) geometric shape annotation. A detailed description of an example estimator is discussed in detail herein.

Figure 11:
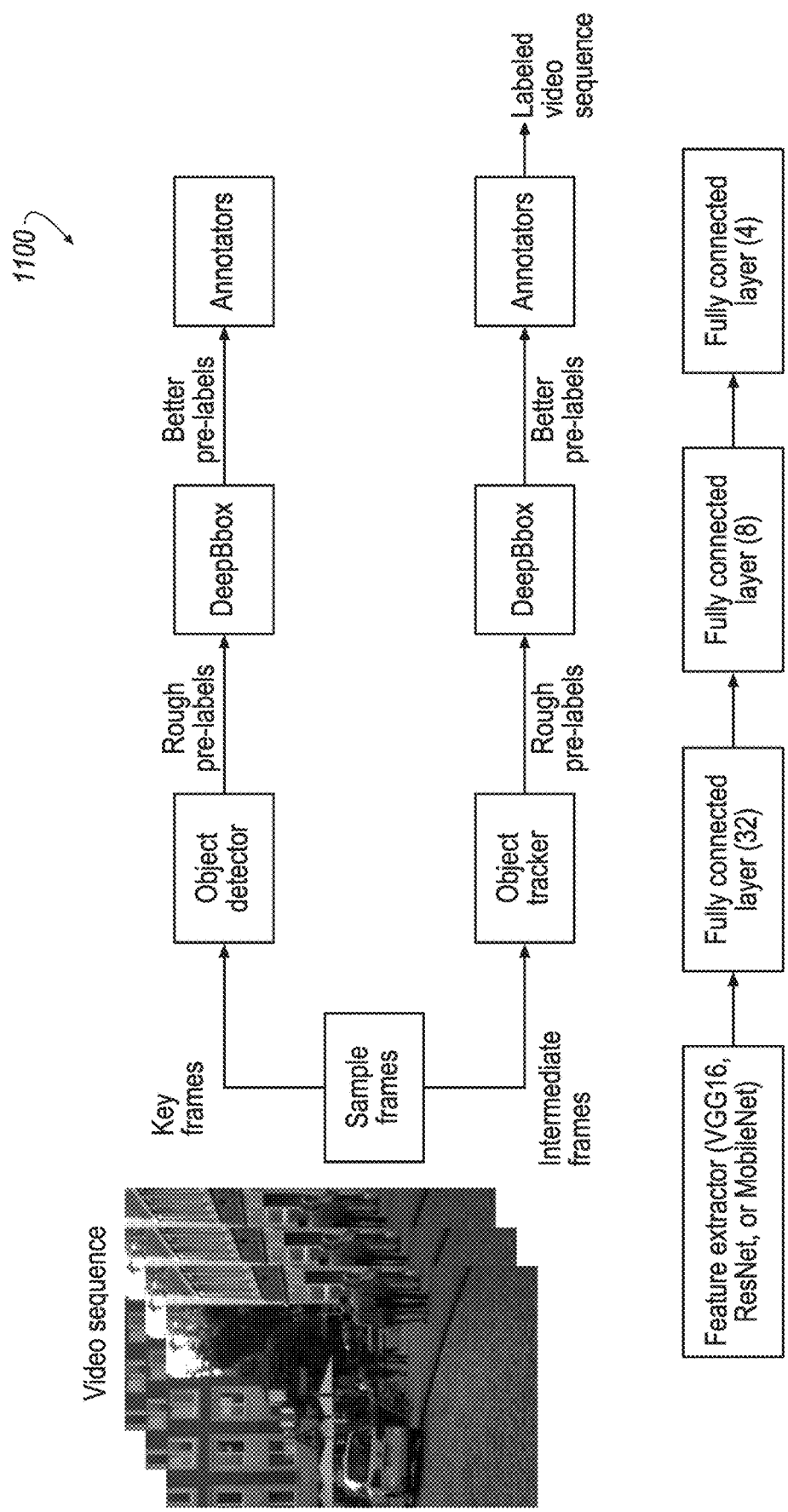
FIG. 11 illustrates an architecture of an AI-based annotator.

FIG. 11 illustrates an architecture 1100 of an AI-based annotator. As shown, the first group of layers are the feature extractors, followed by three fully connected layers. In this example, the output dimension is four, which corresponds to the (x, y) coordinates of bottom left corner and upper right corner of the bounding box. Here, feature extractors refer to the convolutional layers of well-known deep neural network architectures for computer vision, such as VGG16 (described in detail in Karen Simonyan and Andrew Zisserman. Very deep convolutional networks for large-scale image recognition. *arXiv preprint arXiv:*1409.1556, 2014), ResNet50 (described in Kaiming He, Xiangyu Zhang, Shaoqing Ren, and Jian Sun, "Deep residual learning for image recognition," *Proceedings of the IEEE conference on computer vision and pattern recognition*, pages 770-778, 2016), and MobileNet (Andrew G Howard, Menglong Zhu, Bo Chen, Dmitry Kalenichenko, Weijun Wang, Tobias Weyand, Marco Andreetto, and Hartwig Adam, "Mobilenets: Efficient convolutional neural networks for mobile vision applications." *arXiv preprint arXiv:*1704.04861, 2017), each of which is incorporated herein by reference in its entirety.

Regarding the overall architecture, the AI-based annotator first learns and extracts features from images, and then uses the extracted features to estimate the four extreme coordinates of the main object in the image patch. Hence, the architecture is divided into a feature extractor and a coordinate estimator. For the feature extractor, a design goal is to represent the main object in the image patch. This may make use, in some examples, of feature extractors shown effective in various computer vision tasks, such as the first thirteen layers of VGG16, the first forty-nine layers of ResNet50, and the first eighteen layers of MobileNet. Another design metric of the feature extractor is transferability, as data annotation systems usually encounter images with different characteristics; therefore, the AI should be easily transferable to different datasets.

Regarding direct transferability, at the beginning of annotating a new set of images, the AI model used in the annotation pipeline would have been trained with a different dataset. The AI may estimate the four extreme coordinates of the objects as precisely as possible, even though more error is expected since the AI model was trained with a different dataset. This is to say, the AI model should have as low variance as possible, while maintaining estimation power. Given the same size of training data and training strategies, reducing variance calls for reducing the number of parameters.

Regarding minimal data required for adaptation, as much as the AI model is intended to be directly transferable, the model will never perform as well as if it was trained on the same dataset. A common practice in data annotation is to re-train or finetune computer vision algorithms used in the system after a portion of the data is annotated. One can see that if the algorithms can be fine-tuned in the earlier stage during annotation, the more the algorithms can assist human annotators, and hence the lower cost of annotating the whole dataset. Therefore, the AI model should require minimal size of data to be fine-tuned to new datasets.

Moving to the coordinate estimator, top layers of the AI model are configured to learn mappings between extracted image features and the four extreme coordinates of the main object in the image patch. The estimator may be a deep neural network with an architecture including feature extractors and coordinate estimators. The feature extractors may be consistent with the architecture proven to be useful in computer vision literature. Examples of such feature extractors are VGG16, ResNet50, and MobileNet. The coordinate estimators may be configured to learn mappings between extracted image features and the four extreme coordinates of the main object in the image patch. To learn such a nonlinear mapping, more than one layer of regression is needed because the coordinate estimator is inherently more difficult than an object detector (which usually has only one fully connected layer after pooling). A loss function may be defined as well. For the loss function, the purpose of the AI is to make bounding box boundaries as precise as possible, meaning that there are as few as possible pixels between the object extreme points and the bounding box. For instance, L1 distance may be a natural choice for measuring the performance of the estimation. To make the optimization, Huber loss may be adopted. To mimic error in pre-labels for training such an estimator, error statistics may be gathered that were produced in pre-labels and inject such error when generating image patch for training. For a centerline of a body annotation, to use a target object type of a pedestrian, the centerline of the body may be predicted by leveraging machine models for key-points of body and/or interpolation of center line based on two key frames. Attribute annotation generation may also be performed by the machine. The attributes may be generated based on interpolation of two key frames.

The first step of training the AI model is to estimate distributions of the error that the AI model is going to correct. Such error distribution helps the coordinate estimator to localize the main object in the image patch and the training procedure to mimic errors that the AI model needs to correct in the annotation pipeline. In addition, training with error distribution instead of real error from the computer vision algorithms better isolates the AI model from how exactly computer vision algorithms perform in the annotation pipeline, and improve transferability of the AI model to a new dataset.

Using the annotation pipeline in FIG. 11 as an example, the error that the AI model corrects may include object detector error and object tracker error. Ideally, statistics may be collected of both algorithms, but to reduce training effort the AI model may first train with the worse error. In this case, since the object tracker is initialized every K frames and the objects of interest (vehicles and pedestrians) usually do not have sudden change of motion, as long as K is not too large, bounding box boundary error of the object tracker should be smaller than that of the object detector. Hence the AI may operate the object detector over the whole training dataset and match bounding boxes with the ground truth to collect bounding box boundary error statistics introduced by the object detector.

Figure 12:
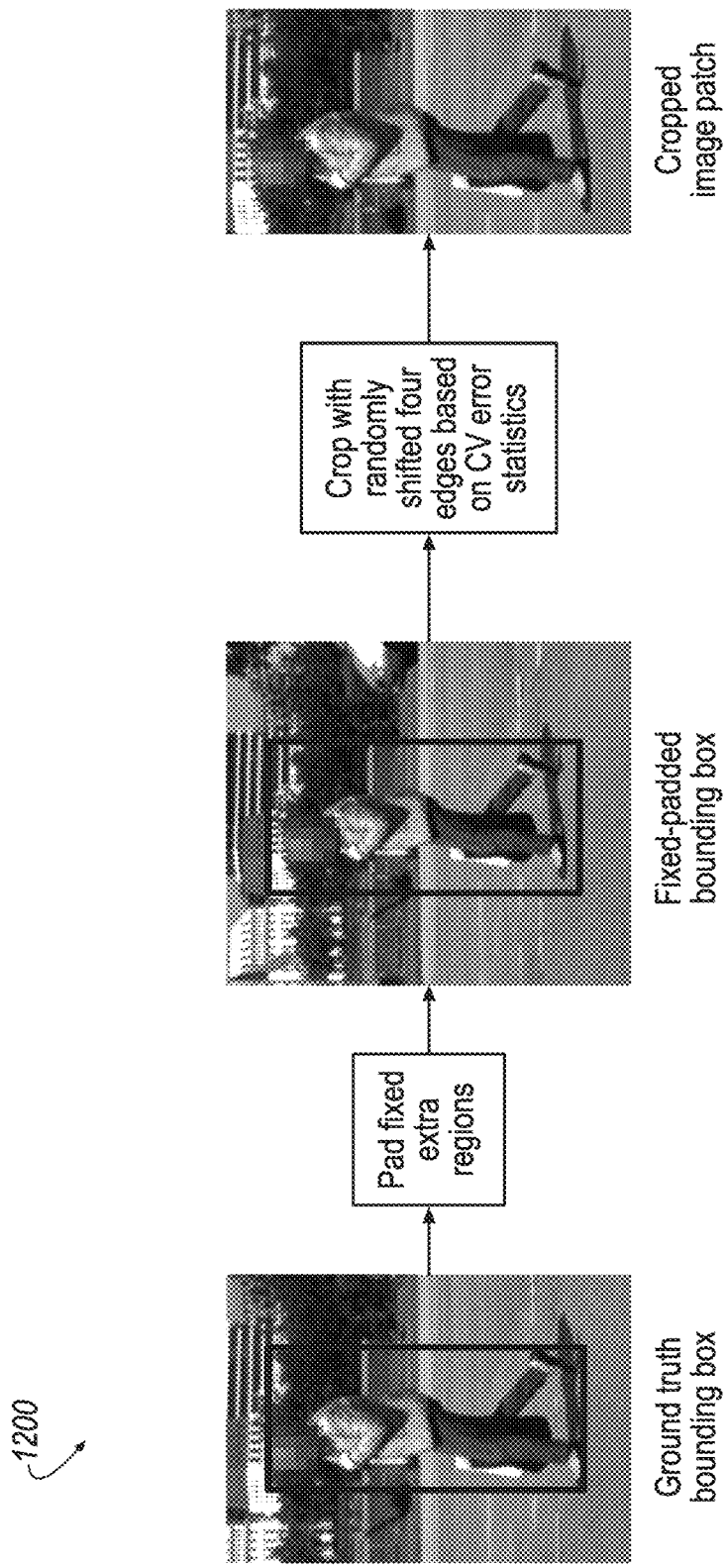
FIG. 12 illustrates an example of a procedure for extracting image patches for training.

FIG. 12 illustrates an example 1200 of a procedure for extracting image patches for training. After obtaining computer vision error statistics, the next step is to extract image patches containing each object and ground truth coordinates of the object within each patch—image patches will be the input of the AI model, and ground truth coordinates will be used to compute the loss value. As shown in the example 1200, given an image and ground truth bounding box of one fully-visible object, the four edges of the ground truth bounding box are first expanded by a fixed ratio to ensure that the object is fully included in the image patch; then the four edges are shifted (depending on the number drawn from the distribution, each edge can be moved inward or outward) randomly based on error statistics collected from the object detector; then image patch is cropped, the patch is normalized to a fixed size as input to train the AI model. The normalization procedure maintains aspect ratio of the original patch and the empty pixels are filled with 0 for all channels. Note that the training patches are generated on the fly during each epoch of training, so size of the cropped patch could be different when an object is used multiple times during training.

There may be certain validation tasks for human annotators. The validation tasks may be divided into three different steps: i) deleting any incorrect annotation that covers untargeted object(s), ii) adding a new annotation that does not cover a targeted object, and iii) adjusting geometric shape annotations if the machine generated annotation do not satisfy a precision requirement. If machine confidence level exists, the validation tasks may be targeted for annotations with a low confidence level.

Then, final review tasks may be performed for all frames. The review process may be one consolidated task, or it may be divided into multiple steps that can be performed by more than one human annotator. The selection of review may be done for annotations with low confidence level. The review may be done interactively with machine. After review, the geometric shape of annotation for all target objects and ID tracking may be done by machine again. Further annotation (e.g., grouping of objects) may be added by machine by calculating overlapping of bounding boxes and attributes of two or more objects.

Figure 13:
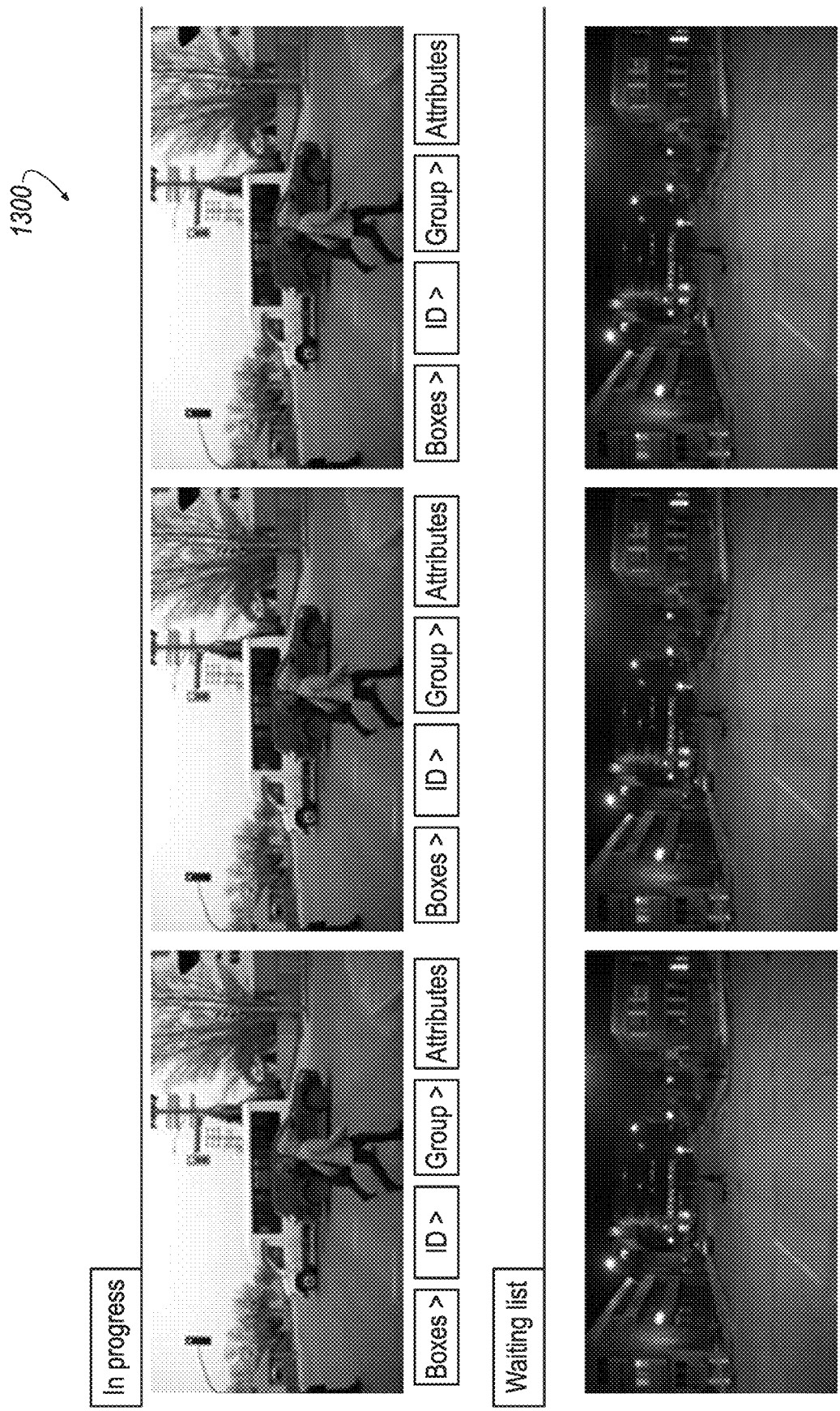
FIG. 13 illustrates an example of a final review task for a set of frames.

FIG. 13 illustrates an example 1300 of a final review task for a set of frames. As shown, three frames are in progress, while three other frames are waiting. Of the three frames in progress, the first frame is indicated as having completed the annotation of bounding boxes and the generation of IDs, while the second and third frames are only indicated as having completed the annotation of bounding boxes.

Continuous training of the machine learning models with outcomes from the annotation system may be performed. The annotation system 100 stores all (including intermediate and final) annotation results to continuously train machine learning algorithms used in the annotation process. Referring back to FIG. 2, the continuous training pipeline architecture has access to the data lake (a storage repository) containing raw image data 132, all annotation data and meta data. The training data selector determines which data shall be used for the next training cycle. The training data selector has functions and logic programmed to statistically analyze distribution of the meta data, compute differences between machine annotations and final annotations, and select the target training data based on the analysis results in order to maximize learning in machine learning algorithms. For example, if final annotations for an object with height>500 pixel in night scenes have <70% IoU (Intersection of Union) with machine annotation, frames with those annotation may be selected as target training data.

Referring to quality control of crowd workers, the annotation system 100 may categorize the human annotators into two different roles depending on their quality profile. One of these roles is that of the average worker, a worker who passed training and qualification, if necessary, to perform annotation task. Another of these roles is the trust nodes/workers, who have done great work in the past and trusted workers are in charge of reviewing the other worker's tasks.

The annotation system 100 may have three different review processes. Depending on task type, one or more of these different review processes may be applied. A first of these processes is a two-level review between workers themselves for the same task. A second of these processes is an independent review/validation task. A third of these review tasks is the final review tasks (for key frames and final results) performed by experts.

Figure 14:
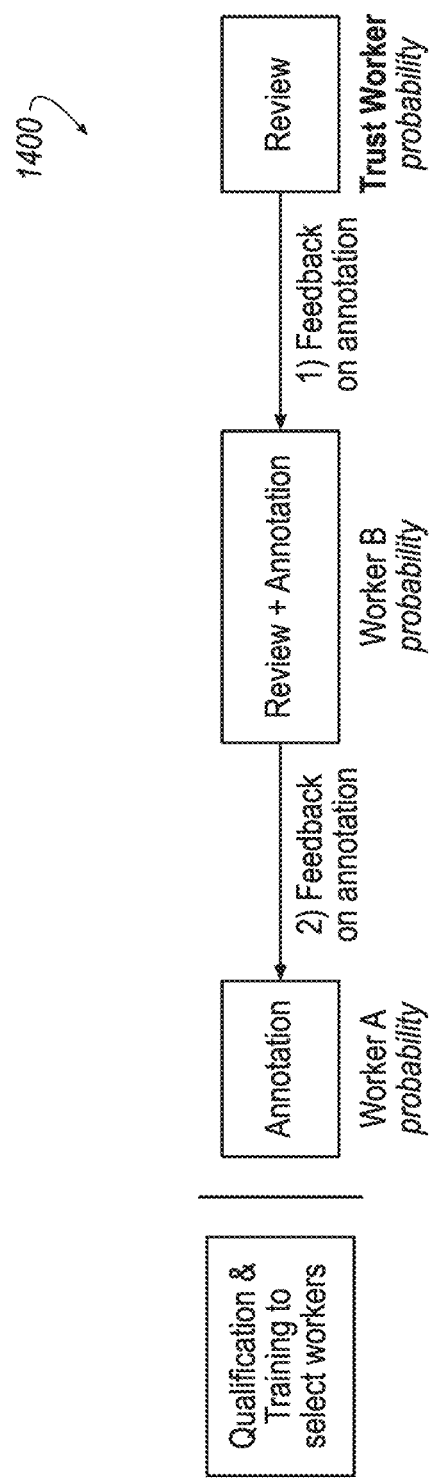
FIG. 14 illustrates an example workflow of a two-level review.

FIG. 14 illustrates an example 1400 workflow of a two-level review. In the two-level review, a worker (human annotator) review happens after each worker (e.g., Worker A) submitted his/her task. The annotation system 100 may assign a review and an annotation task to another worker (e.g., Worker B) to review the accuracy of Worker A and to provide feedback before Worker B works on his/her own annotation task.

Referring more specifically to the example 1400, if the Worker B is not a trust node/worker, then the annotation system 100 may create a review task for trust worker to review Worker B's task. If the review of Worker B's task is negative, the annotation system 100 may send the task to the original worker (Worker B) and ask him/her to revise. If Worker B does not provide a revision until the deadline, the task may be rejected and another review and annotation task may be created. Otherwise the Worker B's task may be approved. If the review of Worker B's task is positive, then the result by Worker B is valid.

If the review of Worker A's task is negative, then the annotation system 100 may send the task to the original worker (Worker A) for revision. If Worker A does not provide a revision until the deadline, the task may be rejected and another review and annotation task may be created. Otherwise, the Worker A's task may be approved. Upon task approval or rejection, the worker's quality profile is updated.

For the independent review/validation task, for annotations that are mostly done by machine, instead of a two-level review process, an independent task may be utilized where review is only done by n number of workers. For the final review tasks (e.g., for key frames and final results of intermediate frames) by experts: before publishing/finalizing ground truths, experts (whose quality profile is higher or equal to minimum quality condition for trust nodes) may be engaged to correct any incorrect annotations.

Figure 15:
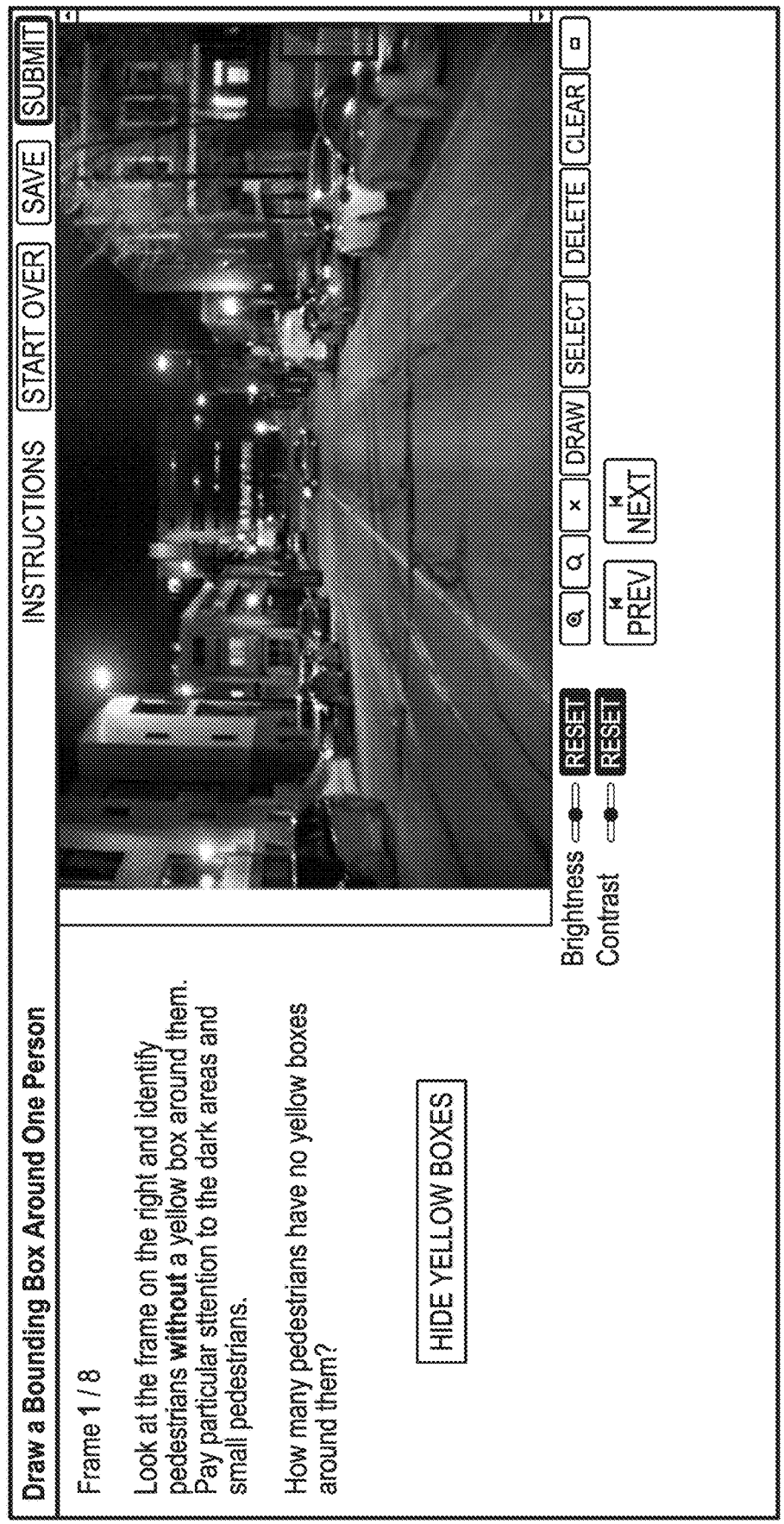
FIG. 15 illustrates an example of a review question used to perform final review.

FIG. 15 illustrates an example 1500 of a review question used to perform final review. As shown, the user interface is requesting the worker look at the frame on the right (the annotation pane) and identify pedestrians without a bounding box around them. The instruction may continue to remind the worker to pay particular attention to the dark areas and small pedestrians. The review question may be to ask how many pedestrians lack bounding boxes around them. In answering this question, the annotation system 100 may receive additional input on the quality of the annotation.

Figure 16:
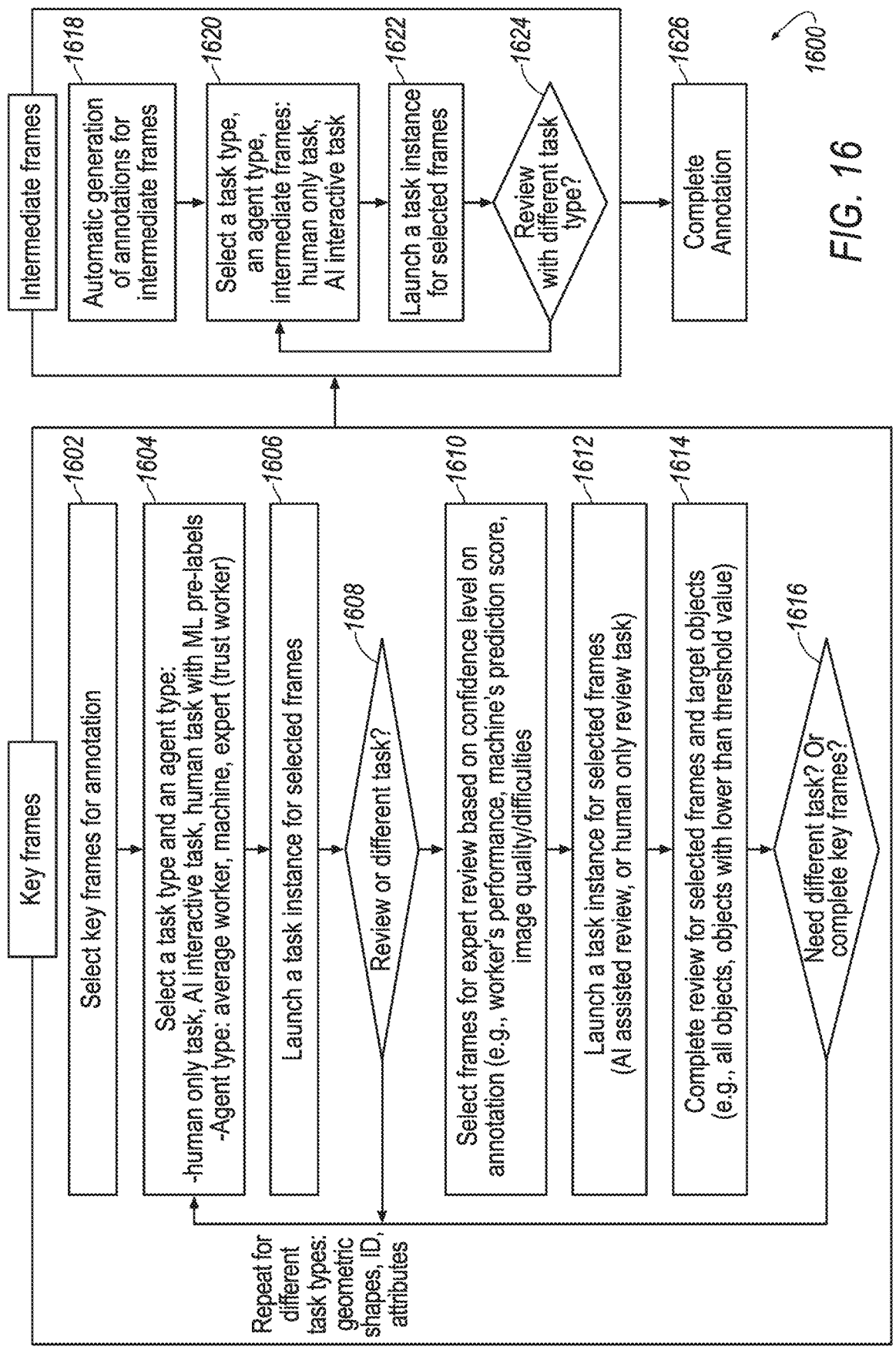
FIG. 16 illustrates an example of a process for the decomposition and performance of annotation tasks as multiple tasks

FIG. 16 illustrates an example of a process 1600 for the decomposition and performance of annotation tasks as multiple tasks. In an example the process 1600 may be performed by the annotation web application 124 in the context of the annotation system 100. The process 1600 may include a flow for the annotation of key frames, as well as a flow for the annotation of intermediate frames.

With respect to key frames, the process may begin at operation 1602 with the annotation web application 124 selecting key frames for annotation. In an example, the annotation web application 124 may identify the key frames in an input video sequence of raw image data 132.

At operation 1604, the annotation web application 124 may identify a task type for the annotation to be performed, and also an agent type for the annotation. The task type may include, for example, a human-only annotation task type, an AI-interactive task type, or a human task with machine-learning pre-labels task type. The agent type may include, for example, a worker with average annotation skill, a worker with expert skill, or a machine. In some examples, these identifications may be performed according to user input. In other examples, these identifications may be performed by the annotation web application 124 based on the raw image data 132 available for annotation.

A test instance may be launched by the annotation web application 124 for the selected frames to perform the annotation at 1606. Example user interfaces for the annotation and/or review of annotations are discussed in detail above with respect to FIGS. 4, 5, 6, 7, 8, 10, 13, and 15. The review may then be performed by the indicted agent type for the indicated task type. Once the review is completed or aborted, at operation 1608 control may return to operation 1604 to select another annotation task.

Additionally or alternately, the process 1600 may continue from operation 1608 to operation 1610, wherein frames of the raw image data 132, as annotated, are selected for expert review. This selection may be performed based on a confidence level of the annotation. For instance, the confidence level may be based on one or more of the performance of the worker performing the annotation task (or the worker's overall performance in all annotation tasks), a prediction score of the machine determined based on the machine identification of the annotations, an analysis of the image quality of the raw image data 132, and/or based on other difficulties in performing the annotation (e.g., human operator or machine lack of ability to identify objects in the raw image data 132).

At operation 1612, the annotation web application 124 launches a review task instance for selected frames of the annotated raw image data 132. In an example, the review may be an AI-assisted review, or a human-only review. Example user interfaces for the annotation and/or review of annotations are discussed in detail above with respect to FIGS. 4, 5, 6, 7, 8, 10, 13, and 15.

At operation 1614, the annotation web application 124 completes the review for the selected frames and target objects. For instance, the annotation web application 124 may confirm that review of the task type has been completed for all objects, for all objects with a lower than a threshold value confidence, etc.

Next, at 1616, the annotation web application 124 determines whether additional annotation and tasks remain to be performed for key frames. If so, control passes to operation 1604. If not, the process 1600 ends.

With respect to annotation of intermediate frames, at operation 1618 the annotation web application 124 may perform an automatic generation of annotations for the intermediate frames. At operation 1620, similar to operation 1604 but for intermediate frames, the annotation web application 124 may select a task type, an agent type for the intermediate frames. This task may be, for example, a human-only task, or an AI-interactive task.

At operation 1622, similar to operation 1606 but for intermediate frames, the annotation web application 124 launches a task instance for the intermediate frames. The review of the intermediate frames may accordingly be performed according to the task type and agent type. After operation 1622, at operation 1624 the annotation web application 124 determines whether there is additional review to be performed of intermediate frames. For instance, there may be some intermediate frames that are to be reviewed using a different task type. If so, control passes to operation 1620. If not, once annotation and review of the key frames and also the intermediate frames is completed, control passes to operation 1626 to indicate the completion of the annotation.

In general, the processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for human-machine collaborated high-precision ground truth data generation for object identification, localization, and tracking in a sequence of images, comprising:

a user interface;

a storage configured to maintain raw image data including video having a sequence of frames, and annotations of the frames that indicate aspects of objects identified in the respective frames; and a processor, in communication with the storage and the user interface, programmed to
determine, for annotation of key frames of the raw image data, a task type for key frames and an agent type for key frames,
receive annotations of objects identified in the key frames of the raw image data according to the key frame task type and key frame agent type,
select to review the key frames based on a confidence level of the annotations of the key frames,
determine, for annotation of intermediate frames of the raw image data, a task type for intermediate frames and an agent type for intermediate frames, and
receive annotations of objects identified in the intermediate frames of the raw image data according to the intermediate frame task type and intermediate frame agent type.

2. The system of claim 1, wherein the task type includes one of a human-only annotation task type, an AI-interactive task type, or a human task with machine-learning pre-labels task type.

3. The system of claim 1, wherein the agent type includes one of a worker with average annotation skill, a worker with expert skill, or a machine using a machine-learning model.

4. The system of claim 1, wherein the processor is further programmed to, when operating using an agent type of a machine using a machine-learning model, detect objects with precise tight bounding geometric shapes using the machine-learning model, the machine-learning model having a deep convolutional network architecture including a feature extractor configured to identify features of the objects, followed by a coordinate estimator configured to identify coordinates of the objects using the identified features.

5. The system of claim 1, wherein the objects for annotation include one or more of pedestrians, cyclists, animals, vehicles, animals, or moving objects in an indoor environment.

6. The system of claim 1, wherein the annotations include one or more of geometric shapes around the objects, bounding boxes around the objects, centerlines of the objects, object-specific attributes, or directions of travel of the objects.

7. The system of claim 1, wherein the confidence level is based on one or more of (i) performance of a worker performing the annotation task, (ii) overall performance of the worker across a plurality of annotation tasks, (iii) a prediction score determined based on a machine-identification of the annotations, or (iv) an analysis of the image quality of the raw image data.

8. The system of claim 1, wherein the processor is further programmed to:
select frames from the raw image data and corresponding manual annotations of the frames;
revise training of a machine-learning model configured to identify objects in the frames using the manual annotations; and
provide machine-learned annotations of the frames for receiving manual corrections via the user interface.

9. The system of claim 8, wherein the raw image data is associated with additional metadata including one or more elements of context information, the context information specifying one or more of weather conditions during which the raw image data was captured, geographic locations of where the raw image data was captured, or times during which the raw image data was captured, and the metadata is used as an input to aid in the revised training of the machine-learning model.

10. The system of claim 8, wherein the manual corrections received via the user interface are used as at least a portion of the manual annotations to revise the training of the machine-learning model.

11. The system of claim 8, wherein the manual annotations of the frames include clicks identifying estimated centers of objects regardless of whether the object is occluded, and the machine-learned annotations include bounding geometric shapes around the objects as identified by the centers.

12. The system of claim 8, wherein the manual annotations of the frames include identifying estimated outmost points of the objects regardless of whether the object is occluded, and the machine-learned annotations include centerlines of the objects as identified by the outmost points.

13. The system of claim 1, wherein the processor is further programmed to, as review of the annotations of the key frames, receive validation input from the user interface, the validation input including one or more of (i) manual deletion of incorrect annotations that cover untargeted objects, (ii) manual addition of new annotations that do not cover a targeted object, and (iii) adjustment of geometric shape annotations for machine-generated annotations that fail to satisfy a precision requirement.

14. A method for human-machine collaborated high-precision ground truth data generation for objects identification, localization, and tracking in a sequence of images, comprising:
maintaining raw image data including video having a sequence of frames, and annotations of the frames that indicate aspects of objects identified in the respective frames, the objects including one or more of pedestrians, cyclists, animals, vehicles, animals, and moving objects in an indoor environment, the annotations include one or more of geometric shapes around the objects, centerlines of the objects, or directions of travel of the objects;
determining, for annotation of key frames of the raw image data, a task type for key frames and an agent type for key frames, the task type including one of a human-only annotation task type, an AI-interactive task type, or a human task with machine-learning pre-labels task type, the agent type including one of a worker with average annotation skill, a worker with expert skill, or a machine using a machine-learning model;
receiving annotations of objects identified in the key frames of the raw image data according to the key frame task type and key frame agent type;
selecting to review the key frames based on a confidence level of the annotations of the key frames;
determining, for annotation of intermediate frames of the raw image data, a task type for intermediate frames and an agent type for intermediate frames; and
receiving annotations of objects identified in the intermediate frames of the raw image data according to the intermediate frame task type and intermediate frame agent type.

15. The method of claim 14, wherein the confidence level is based on one or more of (i) performance of a worker performing the annotation task, (ii) overall performance of the worker across a plurality of annotation tasks, (iii) a prediction score determined based on a machine-identification of the annotations, or (iv) an analysis of the image quality of the raw image data.

16. The method of claim 14, wherein the processor is further programmed to:
   select frames from the raw image data and corresponding manual annotations of the frames,
   revise training of a machine-learning model configured to identify objects in the frames using the manual annotations, and
   provide machine-learned annotations of the frames for receiving manual corrections via the user interface.

17. The method of claim 16, wherein the raw image data is associated with additional metadata including one or more elements of context information, the context information specifying one or more of weather conditions during which the raw image data was captured, geographic locations of where the raw image data was captured, or times during which the raw image data was captured, and the metadata is used as an input to aid in the revised training of the machine-learning model.

18. The method of claim 16, wherein the manual corrections received via the user interface are used as at least a portion of the manual annotations to revise the training of the machine-learning model.

19. The method of claim 16, wherein the manual annotations of the frames include clicks identifying estimated centers of objects regardless of whether the object is occluded, and the machine-learned annotations include geometric shapes around the objects as identified by the centers.

20. The method of claim 16, wherein the manual annotations of the frames include identifying estimated outmost points of the objects regardless of whether the object is occluded, and the machine-learned annotations include centerlines of the objects as identified by the outmost points.

21. The method of claim 14, wherein the processor is further programmed to, as review of the annotations of the key frames, receive validation input from the user interface, the validation input including one or more of (i) manual deletion of incorrect annotations that cover untargeted objects, (ii) manual addition of new annotations that do not cover a targeted object, and (iii) adjustment of geometric shape annotations for machine-generated annotations that fail to satisfy a precision requirement.

22. A non-transitory computer-readable medium comprising instructions that, when executed by a processor, cause the processor to:
   maintain raw image data including video having a sequence of frames, and annotations of the frames that indicate aspects of objects identified in the respective frames, the objects including one or more of pedestrians, cyclists, animals, vehicles, animals, and moving objects in an indoor environment, the annotations include one or more of geometric shapes around the objects, centerlines of the objects, or directions of travel of the objects;
   determine, for annotation of key frames of the raw image data, a task type for key frames and an agent type for key frames, the task type including one of a human-only annotation task type, an AI-interactive task type, or a human task with machine-learning pre-labels task type, the agent type including one of a worker with average annotation skill, a worker with expert skill, or a machine using a machine-learning model;
   receive annotations of objects identified in the key frames of the raw image data according to the key frame task type and key frame agent type;
   select to review the key frames based on a confidence level of the annotations of the key frames, the confidence level being based on one or more of (i) performance of a worker performing the annotation task, (ii) overall performance of the worker across a plurality of annotation tasks, (iii) a prediction score determined based on a machine-identification of the annotations, or (iv) an analysis of the image quality of the raw image data;
   determine, for annotation of intermediate frames of the raw image data, a task type for intermediate frames and an agent type for intermediate frames; and
   receive annotations of objects identified in the intermediate frames of the raw image data according to the intermediate frame task type and intermediate frame agent type.

23. The medium of claim 22, further comprising instructions that, when executed by the processor, cause the processor to:
   select frames from the raw image data and corresponding manual annotations of the frames;
   provide machine-learned annotations of the frames for receiving manual corrections via the user interface; and
   utilize the manual corrections received via the user interface as at least a portion of the manual annotations to revise the training of the machine-learning model to identify the objects,
   wherein the raw image data is associated with additional metadata including one or more elements of context information, the context information specifying one or more of weather conditions during which the raw image data was captured, geographic locations of where the raw image data was captured, or times during which the raw image data was captured, and the metadata is used as an input to aid in the revised training of the machine-learning model.

24. The medium of claim 22, further comprising instructions that, when executed by the processor, cause the processor to, as review of the annotations of the key frames, receive validation input from the user interface, the validation input including one or more of (i) manual deletion of incorrect annotations that cover untargeted objects, (ii) manual addition of new annotations that do not cover a targeted object, and (iii) adjustment of geometric shape annotations for machine-generated annotations that fail to satisfy a precision requirement.

* * * * *